United States Patent [19]
Isenberg

[11] Patent Number: 5,944,839
[45] Date of Patent: Aug. 31, 1999

[54] SYSTEM AND METHOD FOR AUTOMATICALLY MAINTAINING A COMPUTER SYSTEM

[75] Inventor: Henri J. Isenberg, Los Angeles, Calif.

[73] Assignee: Symantec Corporation, Cupertino, Calif.

[21] Appl. No.: 08/820,573

[22] Filed: Mar. 19, 1997

[51] Int. Cl.$^6$ ...................................................... G06F 11/00
[52] U.S. Cl. ................................ 714/26; 714/38; 714/47; 706/47
[58] Field of Search .................................. 706/45, 54, 47, 706/46; 395/183.02, 183.14, 183.15, 184.01, 185.01; 364/274, 274.1–274.7; 714/26, 38, 39, 47, 48

[56] References Cited

U.S. PATENT DOCUMENTS

| | | | |
|---|---|---|---|
| 4,796,206 | 1/1989 | Boscove et al. | 364/555.01 |
| 5,455,947 | 10/1995 | Suzuki et al. | 395/650 |
| 5,481,481 | 1/1996 | Frey et al. | 364/551.01 |
| 5,619,656 | 4/1997 | Graf | 395/200.11 |
| 5,809,493 | 9/1998 | Ahamed et al. | 206/52 |

OTHER PUBLICATIONS

Se Young Park et al.; "OASIX: A Real–Time Knowledge–Based System for UNIX Operations and Administration"; 1991; pp. 389–392.
Jun Takamura; "An Expert System For Computer Operation And User Assistance"; Aug. 1989; pp. 87–95.
R. L. Ennis et al.; A Continuous Real–Time Expert System For Computer Operations; Jan. 1986; pp. 14–28.

*Primary Examiner*—Dieu-Minh T. Le
*Attorney, Agent, or Firm*—Fenwick & West LLP

[57] ABSTRACT

A system and method for the automated maintenance of a computer system. A scheduler periodically activates sensors. When activated, the sensors gather information about various aspects of the computer system. The sensors store this information in a knowledge database. The knowledge database also contains cases, questions, and actions. The cases describe potential computer problems and solutions. The questions are used to diagnose the problems while the actions describe steps that can be taken to solve the diagnosed problems. If the information gathered by the sensors indicates a problem with the computer system, then the sensors activate an artificial intelligence engine. The engine uses the information in the knowledge database to evaluate certain cases. If information necessary to evaluate a case is not in the knowledge database, then the engine activates a sensor to gather the information. As the cases are evaluated, the confidence levels of certain other cases, questions, and actions increase. If the confidence level of a case or question rises above a predetermined threshold, then the engine evaluates that case or question. If the confidence level of an action rises above the threshold, then that action represents the likely solution to the problem. Accordingly, the engine activates a sensor to perform the action. If no case, question, or action rises above the threshold, then the knowledge database does not contain enough information to solve the problem. In such a case, the engine saves the state of the computer system and knowledge database. Then, a human expert can update the database with the knowledge necessary to solve the problem.

17 Claims, 3 Drawing Sheets

SYSTEM AND METHOD FOR AUTOMATICALLY MAINTAINING A COMPUTER SYSTEM

FIELD OF THE INVENTION

This invention pertains in general to computer maintenance tools and in particular to a maintenance tool that automatically repairs a computer system with little or no human intervention.

BACKGROUND OF THE INVENTION

Many strides have been made in the last few years to simplify the operation of personal computers. Even today, however, most personal computers contain complicated software that is not understood by the typical computer user. As a result, this software is often not optimized to fully realize the power of the computer system. If the unoptimized software is the operating system or other software critical to the computer system, the user may suffer significant computer delays or malfunctions.

Therefore, there is a great need for technical support professionals who can diagnose, repair, and optimize personal computers. However, these professionals are often unavailable or to expensive to call when a computer problem occurs. Therefore, various companies have developed software utilities that automate computer system maintenance.

Such utilities, however, rarely perform as well as a support professional. Some utilities, such as SYSTEM AGENT by Microsoft Corp. (Redmond, Wash.), merely schedule a fixed set of tools to execute at predetermined intervals. This "canned" approach is limited in its flexibility and ability to judge when to appropriately administer maintenance. Since maintenance can often take several hours, moreover, a fixed schedule often performs far too much maintenance.

Other utilities, such as NORTON'S SYSTEM DOCTOR by Symantec Corp. (Cupertino, Calif.) attempt to sense when computer maintenance is required. While this sensing removes the necessity of a fixed schedule, it often misdiagnoses the computer problem. As a result, the utility often applies an inappropriate solution.

There is a further need in the art for a computer utility that has a flexible approach toward diagnosing and solving computer system problems.

There is a further need in the art for a computer utility that can learn from the results of prior diagnoses and solutions and apply that learned knowledge to future computer system problems.

There is a further need in the art for a computer utility that judges when it is appropriate to administer a selected course of maintenance.

SUMMARY OF THE INVENTION

The above and other needs are met by a computer utility that uses a set of sensors in combination with case base to diagnose and solve computer system problems. The sensors are actually diagnostic and repair tools executing on the computer system. The sensors act as a monitoring system that monitors the operation of the computer system. When one of the sensors detects a problem, the sensor activates an artificial intelligence ("AI") engine.

The AI engine includes a large database, or case base, of knowledge held by computer experts. This knowledge includes that necessary to diagnose and correct problems with the general operation of the computer system, including the operating system and hardware. In addition, the sensors act as inputs into the database.

The AI engine uses the sensor inputs to diagnose the likely cause of the problem and determine the best solution. While processing the problem, the AI engine may reach a point where additional data are needed. If so, the AI engine requests the data from the appropriate sensor or sensors. Once the appropriate solution is determined from the data, the AI engine activates the appropriate sensor to perform the repair.

A technical advantage of the present invention is that human intervention is not needed to diagnose and repair computer system problems.

Another technical advantage of the present invention is the reduced business cost associated within owning a personal computer. Since human intervention is rarely required, the cost of hiring a computer expert is avoided.

Another technical advantage of the present invention is that the present invention is easily upgradeable. The present invention can be programmed with new rules and sensors so that the invention can address an increasing number of computer problems.

Further features and advantages of the invention will become more readily apparent from the following detailed description when taken in conjunction with the accompanying drawings.

DETAILED DESCRIPTION OF THE PREFERRED EMBODIMENTS

Figure 3:
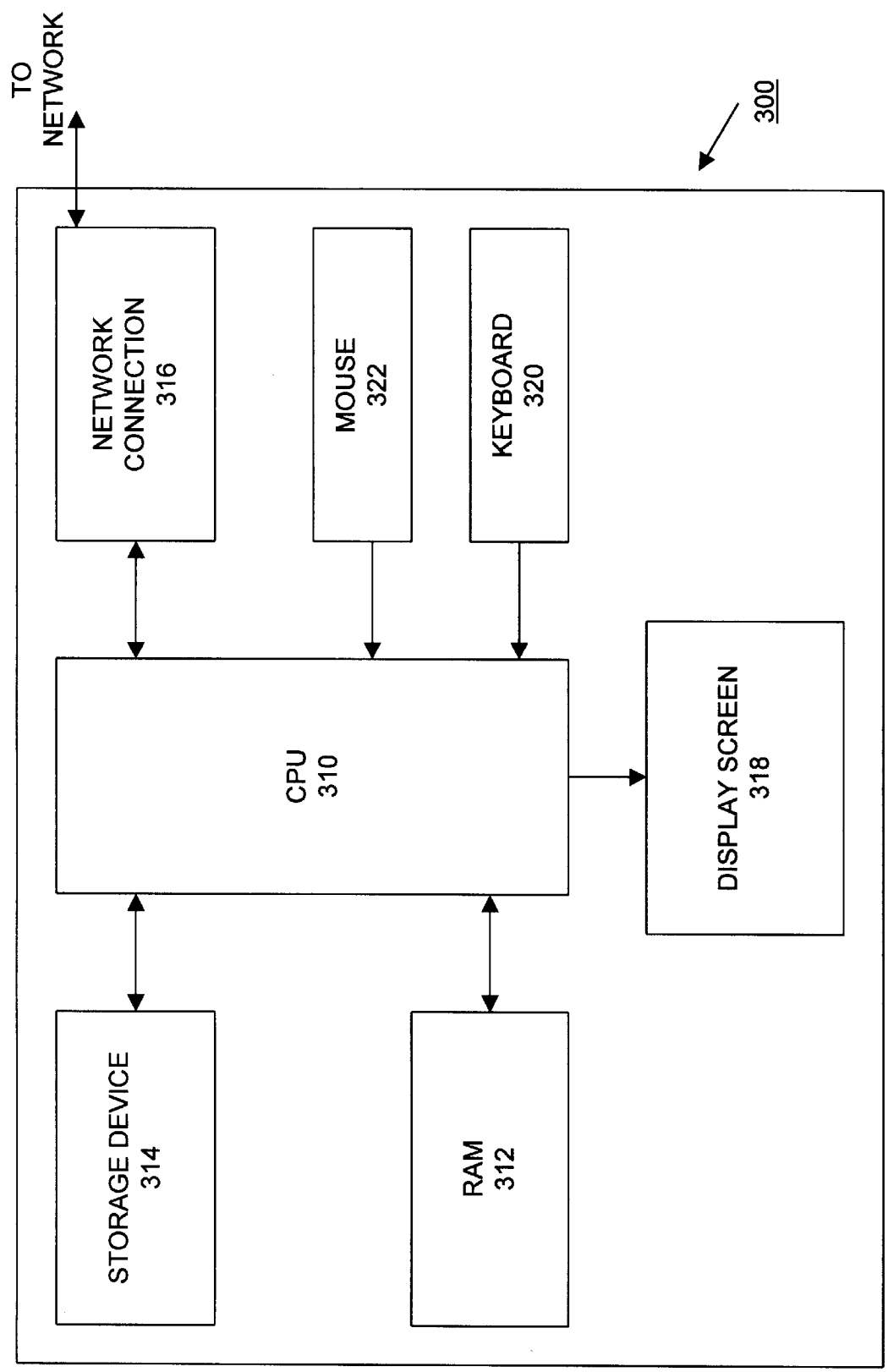
FIG. 3 is a high level block diagram of a computer system adapted to execute the present invention.

FIG. 3 illustrates a high level block diagram of a computer system 300 adapted to execute the present invention. Preferably, the computer system 300 is a conventional personal computer or workstation having conventional hardware components such as processor 310, a memory 312, a storage device 314, a network connection 316, a display 318, a keyboard 320, and an input device 322, such as a mouse. The processor 310 may be a conventional processor that is commercially available such as a PENTIUM™ processor by Intel Corporation (Santa Clara, Calif.), a POWERPC™ processor by IBM Corporation (Armonk, N.Y.) or Motorola, Inc. (Schaumburg, Ill.), an ALPHA™ processor by Digital Equipment Corporation (Maynard, Mass.), or a SPARC™ processor by Sun Microsystems, Inc. (Mountain View, Calif.). The computer system 300 can use conventional software operating environments that are commercially available such as MICROSOFT WINDOWS™ from Microsoft Corporation (Redmond, Wash.), Apple System 7.x from Apple Computer, Inc. (Cupertino, Calif.), or UNIX-based operating systems. A preferred embodiment of the present invention executes on a computer system 300 having an Intel compatible processor 310 executing the MICROSOFT WINDOWS operating system. The present invention is typically stored on the storage device 314 and executed by the processor 310 from memory 312 as is well understood in the art.

In the following discussion, the term "computer problem" refers to any aspect of the computer system 300 that is either malfunctioning or not optimized. Therefore, computer problems include such things as a fragmented file on storage device 314, an incorrect video driver, and a poorly configured memory manager.

Figure 1:
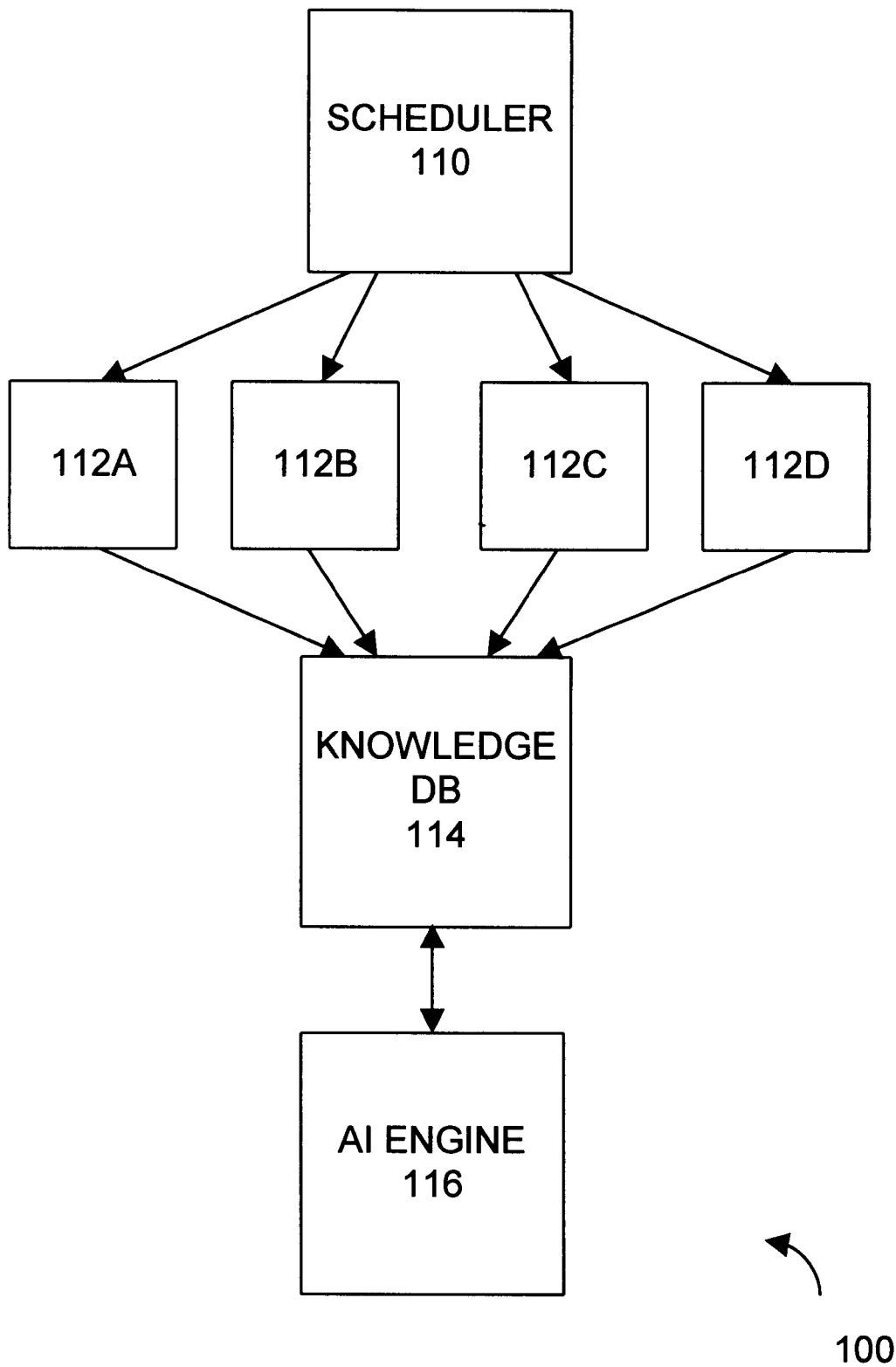
FIG. 1 is a high-level block diagram illustrating the major components of the present invention.

FIG. 1 is a high-level block diagram of the major components of a maintenance tool 100 according to the present invention. FIG. 1 illustrates a scheduler 110, a number of sensors 112a–112d, a knowledge database 114, also called a "case base," and an artificial intelligence ("AI") engine 116. The scheduler 110 is a software program that monitors the computer system 300 for problems. The scheduler 110 performs this monitoring by scheduling one or more of the sensors 112 to execute at predetermined times.

The sensors 112 are software programs that gather information from the computer system 300. There are two main types of sensors 112: event sensors and query sensors. Event sensors are those that sense data in response to an event. For example, a free storage space sensor could sense every time the free space on the storage device 314 shrinks below 10 megabytes. Query sensors, in contrast, are those that sense data in response to a query from an external source. For example, a free storage space sensor could sense and then provide the amount of available storage space in response to a request from another program. A sensor 112 can sense its data from the computer system 300, or, if necessary, the sensor can prompt the user to input the required data. The present invention preferably contains many different event and query sensors. Each sensor 112 is responsible for sensing a different aspect of the computer system. In addition, each sensor 112 can perform certain repair operations related to the type of data it senses. For example, a free storage space sensor can also delete files in order to create more free space.

When a sensor 112 is executed by the scheduler 110, the sensor 112 senses information about the computer system 300. This information is then stored in the knowledge database 114 where it can be accessed by the AI engine 116. In one embodiment of the present invention, the knowledge database is in the CBR Express case base format. Additional information about the CBR Express case base format is found in the CBR EXPRESS 2.0 FOR WINDOWS manual, available from Inference Corporation (El Segundo, Calif.) and which is hereby incorporated by reference. Of course, the present invention can use any knowledge database format that supports the functions described below.

The knowledge database 114 contains "cases" describing computer problems and solutions. A case is evaluated by answering a series of questions within the case. These questions are sequenced such that answering the questions diagnoses the computer problem and leads to a likely solution.

Questions belong to one of four categories: Yes/No; Numeric; Text; and List. Yes/No questions are those that have Yes or No answers. Numeric questions are those having answers that are integers. Text questions have textual answers. Finally, List questions have answers selected from a list of legal answers.

Each case also contains one or more actions. An action is a statement that indicates a solution to a computer problem. An action, however, may contain multiple steps necessary to perform the solution. Actions are not case specific and may be shared among multiple cases.

The cases within the knowledge database 114 are derived from knowledge held by experts having backgrounds in troubleshooting and maintaining computer system environments. Some areas of expertise represented in the knowledge database include WINDOWS 95 and hardware installation. Of course, other areas of expertise can easily be represented. In addition, the cases 114 are customizable and easily updated.

Each case can have a confidence value. The confidence value of a case indicates the degree to which the tool 100 believes the case is relevant to the diagnosis of the computer problem. Likewise, questions and actions can have confidence values. For a question, the confidence value indicates the degree to which the tool 100 believes the question is relevant to the diagnosis. For an action, similarly, the confidence value represents the likelihood that that action is a solution to the computer problem.

The AI engine 116 is the portion of the tool 100 that actually processes the cases in the knowledge database 114. The AI engine 116 is preferably an inference engine implementing both forward and backward chaining methods for determining possible solutions to the computer problem. One embodiment of the present invention uses the CBR2 inference engine from Inference Corporation (El Segundo, Calif.). However, any form of rule based AI engine, such as an expert system or neural net, could be used.

The AI engine 116 evaluates cases and adjust confidence levels of other cases, questions, and actions according to rules in the knowledge database. The rules answer questions based on data in the knowledge database. Rules answer text questions, for example, by matching specific words or phrases found in the answer with particular key words in the knowledge database. Once one or more questions have been answered, the rules may be able to use those answers to eliminate or answer other questions and adjust the confidence levels of other cases, actions, and questions.

The AI engine 116 uses the information supplied by the sensors 112 to evaluate the cases. If needed information has not already been collected by the sensors 112, the AI engine 116 will activate the particular sensor capable of gathering the needed information. That sensor 112 will gather the information from the computer system 300 or computer user and place it in the knowledge database 114.

Figure 2:
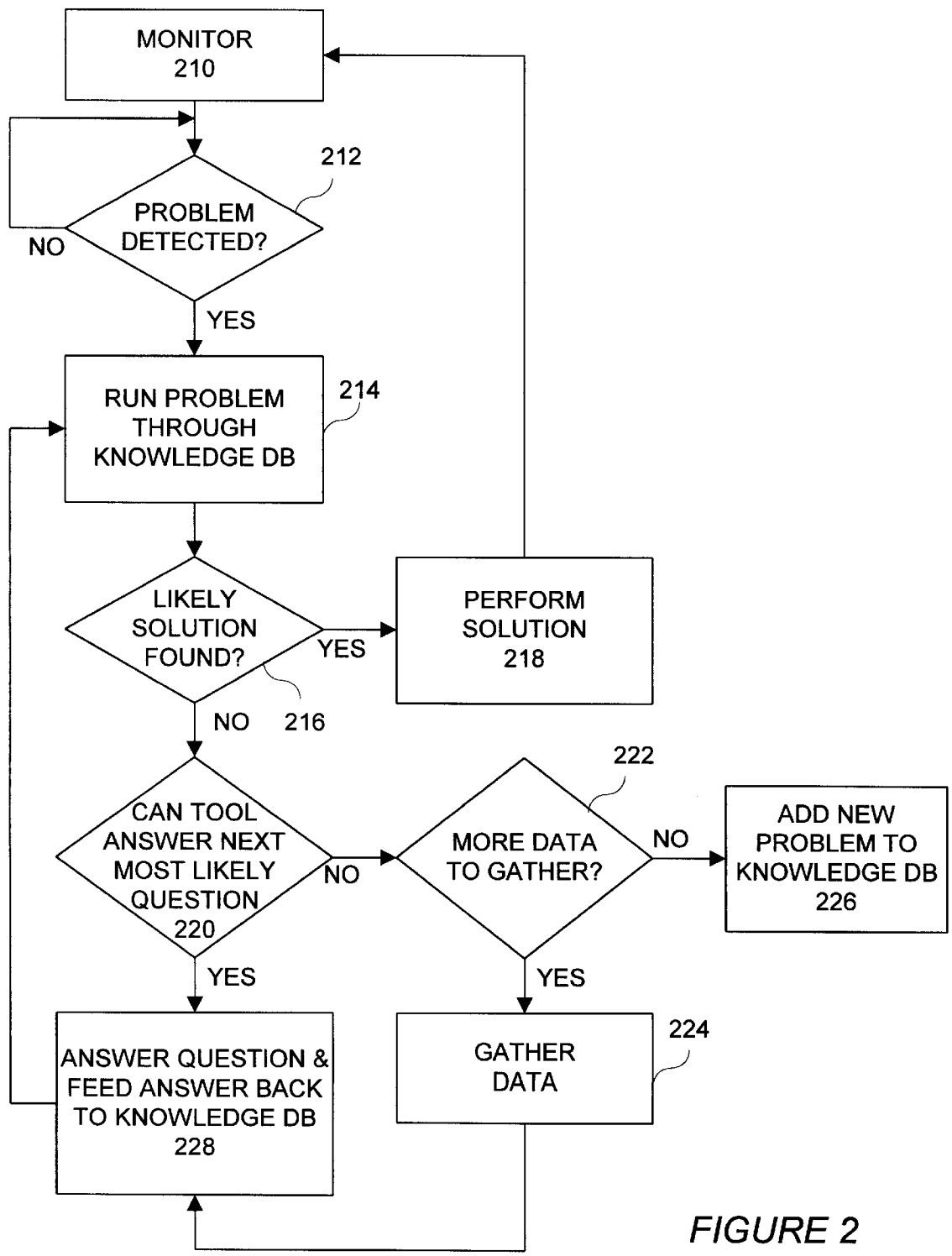
FIG. 2 is a flow chart illustrating the process by which the present invention detects, diagnosis, and rectifies computer problems.

FIG. 2 is a flow chart illustrating the process by which the present invention detects, identifies, and solves computer problems. At step 210, the scheduler monitors the computer system 300. At predetermined time intervals, the scheduler 110 activates various sensors 112 to determine the state of the computer system 300 and store relevant data in the knowledge database 114. If a problem is detected by one of the sensors (step 212), then the sensor 112 triggers the AI engine 116 to begin solving the problem.

At step 214, the AI engine 116 runs the problem through the knowledge database 114. This step involves evaluating a series of cases and questions. If the data necessary to evaluate a question are not known, then the AI engine 116 activates an appropriate query sensor to retrieve the data necessary to complete the evaluation. The result of each evaluation affects the confidence levels of certain other cases, questions, and actions. If the confidence level of a certain action rises above a predetermined threshold, say 85%, then that action is a likely solution (step 216). Accordingly, the AI engine 116 directs the appropriate sensor 112 to perform the action (step 218). If the sensor cannot perform the action by itself, the sensor 112 will tell the computer user to perform the action.

If no action rises above the threshold, then the AI engine 116 evaluates the case or question having the highest confidence level (step 220). If more data is necessary to evaluate the case or question (step 222), the AI engine 116 directs the appropriate sensor to gather the data (step 224). At step 228, the AI engine 116 evaluates the question or case and then returns to step 214.

If the tool 100 has gathered all possible data and still does not have a solution to the computer problem, then the AI engine 116 has failed to find a solution in the knowledge database 114. This failure represents computer problem which is new to the tool. Accordingly, the tool 100 preferably saves the state of the computer system 300 and knowledge database 114 to a location where the state and database can be examined by a human computer expert (step 226). Presumably, the human expert can then solve the computer problem and add the solution to the knowledge database 114.

The invention has been described with reference to particular preferred embodiments, but variations within the spirit and scope of the invention will occur to those skilled in the art.

What is claimed is:

1. A tool for automatically maintaining a computer system having a processor and a memory, the tool comprising:

a knowledge database stored in the memory and holding a plurality of cases describing potential computer problems and corresponding likely solutions;

a plurality of sensors stored in the memory and executing on the processor and adapted for gathering data about the computer system, storing the data in the knowledge database, and detecting whether a computer problem exists from the data and the plurality of cases; and an AI engine stored in the memory and executing on the processor in response to detection of a computer problem and utilizing the plurality of cases to determine a likely solution to the detected computer problem, wherein when the knowledge database lacks data necessary to determine a likely solution to the computer problem, the AI engine activates a particular sensor in the plurality of sensors to gather the necessary data and store the data in the knowledge database, and wherein when the knowledge database does not describe a likely solution to the computer problem, the AI engine saves the gathered data in the knowledge database as a new case.

2. The tool of claim 1, wherein each case comprises:

at least one question asking about a particular aspect of the computer system that can be answered by the data gathered by the plurality of sensors; and at least one action describing a likely solution to a potential computer problem stored in the knowledge database.

3. The tool of claim 2, wherein the AI engine executes a particular sensor of the plurality of sensors to carry out a likely solution to the computer problem detected by the plurality of sensors.

4. The tool of claim 3, wherein the particular sensor requests that a computer user carry out the likely solution to the computer problem.

5. The tool of claim 1, wherein first selected ones of the plurality of sensors gather data about the computer system by observing the computer system and second selected ones of the plurality of sensors gather data about the computer system by requesting data from a computer user.

6. A method of optimizing a computer system, the method comprising the steps of:

detecting a problem in the computer system;

activating an AI engine in response to the problem detection;

utilizing, by the AI engine, selected ones of a plurality of sensors to gather information about the computer system;

determining, by the AI engine, a likely solution to the problem from the gathered information; and when a likely solution cannot be determined, saving a state of the computer system.

7. The method of claim 6, wherein the selected ones of the plurality of sensors gather information by requesting input from a computer user.

8. The method of claim 6, wherein the determining step comprises the substeps of:

inferring the likely solution to the problem from questions, actions, and rules contained in a knowledge database; wherein the AI engine utilizes the selected ones of the plurality of sensors to gather information when the knowledge database lacks information necessary to answer a question.

9. The method of claim 8, wherein the AI engine uses forward chaining to infer the solution.

10. The method of claim 8, wherein the AI engine uses backward chaining to infer the solution.

11. The method of claim 6, wherein the AI engine is a case-based inference engine.

12. The method of claim 6, further comprising the step of:

applying, by selected ones of the plurality of sensors, the likely solution to the computer system.

13. The method of claim 12, wherein the applying step comprises the substep of:

requesting that a computer user apply the likely solution.

14. The method of claim 6, wherein the detecting step comprises the steps of:

periodically activating selected ones of the plurality of sensors to gather information about the computer system; and analyzing the information to determine whether a problem exists.

15. A program storage device readable by a computer system, the program storage device tangibly embodying a program of instructions executable by the computer system to perform method steps for automatically maintaining the computer system, the program storage device holding instructions for:

sensing information about the computer system by at least one sensor;

determining whether a computer problem exists from the sensed information;

searching a plurality of cases with the sensed information to determine whether a likely solution to the computer problem exists;

when additional information is needed to determine a likely solution to the computer problem, activating the at least one sensor to sense the additional information; and when a likely solution to the computer problem does not exist, saving the sensed information as a new case of the plurality of cases.

16. The program storage device of claim 15, wherein the at least one sensor senses information about the computer system by requesting information from a computer user.

17. The program storage device of claim 15, wherein the sensing step comprises the substep of:

periodically activating the at least one sensor to gather information about the computer system.

* * * * *